(12) United States Patent
Sugiyama et al.

(10) Patent No.: US 8,836,272 B2
(45) Date of Patent: Sep. 16, 2014

(54) POWER CONTROL DEVICE FOR VEHICLE

(75) Inventors: Yoshinobu Sugiyama, Toyota (JP); Wanleng Ang, Okazaki (JP); Kenji Itagaki, Okazaki (JP); Yoshikazu Kataoka, Seto (JP); Naomi Matsumoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 102 days.

(21) Appl. No.: 13/574,815

(22) PCT Filed: Feb. 26, 2010

(86) PCT No.: PCT/JP2010/053129
§ 371 (c)(1),
(2), (4) Date: Jul. 24, 2012

(87) PCT Pub. No.: WO2011/104872
PCT Pub. Date: Sep. 1, 2011

(65) Prior Publication Data
US 2012/0313584 A1    Dec. 13, 2012

(51) Int. Cl.
H02J 7/14      (2006.01)
H02J 7/00      (2006.01)
B60K 1/00      (2006.01)
B60K 6/20      (2007.10)
B60L 11/18     (2006.01)
B60L 11/12     (2006.01)
B60L 11/14     (2006.01)

(52) U.S. Cl.
CPC ............... B60L 11/14 (2013.01); *Y02T 90/121* (2013.01); *Y02T 10/6217* (2013.01); *Y02T 10/7022* (2013.01); *Y02T 10/7061* (2013.01); *Y02T 10/7077* (2013.01); *Y02T 10/7088* (2013.01); *Y02T 10/7005* (2013.01); *Y02T 90/14* (2013.01); *B60L 2220/14* (2013.01); B60L 11/1864 (2013.01); B60L 11/123 (2013.01); B60L 11/1855 (2013.01); B60L 11/1816 (2013.01)

USPC ........ 320/104; 320/109; 180/65.1; 180/65.21

(58) Field of Classification Search
CPC ........................... Y02T 10/7005; Y02T 90/14
USPC ......... 320/104, 109, 112, 116; 180/65.1–65.5
See application file for complete search history.

(56) References Cited

U.S. PATENT DOCUMENTS 8,004,249 B2 * 8/2011 Lim et al. ...................... 320/166
2004/0178766 A1 * 9/2004 Bucur et al. ................... 320/112

(Continued)

FOREIGN PATENT DOCUMENTS

JP    A-10-164709    6/1998
JP    A-2000-116143  4/2000

(Continued)

OTHER PUBLICATIONS

International Search Report issued in International Patent Application No. PCT/JP2010/053129 dated Apr. 27, 2010.

*Primary Examiner* — Richard V Muralidar
*Assistant Examiner* — Michael DiBenedetto
(74) *Attorney, Agent, or Firm* — Oliff PLC

(57) ABSTRACT

A vehicle includes a PCU controlling electric power supplied to a motor, a first power storage device, a second power storage device, an ECU, a charger, system main relays SMR1 to SMR4, SMRA, SMRB, and charging relays CR1 to CR4. The first power storage device is formed such that a first module and a second module which are separately disposed are connected in series through SMRA and SMRB. The first power storage device is connected to the PCU through SMR1 and SMR2. The second power storage device is connected to the PCU through SMR3 and SMR4. The charger has a capacitor that is connected to the first power storage device through CR1 and CR2 and also connected to the second power storage device through CR3 and CR4. When charging is completed, the ECU turns on CR1, CR2, SMR1, and SMR2, and turns off SMRA, SMRB, CR3, CR4, SMR3, and SMR4.

3 Claims, 4 Drawing Sheets

(56) References Cited

U.S. PATENT DOCUMENTS

| | | | |
|---|---|---|---|
| 2008/0246340 A1* | 10/2008 | Swisher | 307/66 |
| 2009/0079384 A1* | 3/2009 | Harris | 320/102 |
| 2010/0148583 A1* | 6/2010 | Kukunuri | 307/66 |
| 2010/0219794 A1 | 9/2010 | Sugimoto et al. | |
| 2011/0127957 A1* | 6/2011 | Chen et al. | 320/109 |
| 2011/0291612 A1* | 12/2011 | Fujitake | 320/107 |
| 2012/0123625 A1* | 5/2012 | Ueo et al. | 701/22 |

FOREIGN PATENT DOCUMENTS

| | | |
|---|---|---|
| JP | A-2006-224772 | 8/2006 |
| JP | A-2009-106054 | 5/2009 |
| JP | A-2009-131077 | 6/2009 |
| JP | A-2009-254169 | 10/2009 |

\* cited by examiner

POWER CONTROL DEVICE FOR VEHICLE

TECHNICAL FIELD

The present invention relates to a vehicle capable of charging a power storage device provided therewithin by an external power supply.

BACKGROUND ART

Japanese Patent Laying-Open No. 10-164709 (PTL 1) discloses a vehicle including a capacitor provided between input lines of an inverter converting electric power of the battery and supplying the power to a motor for driving the vehicle, in which a discharge relay and a discharge resistance for discharging electric charge in a smoothing capacitor are provided between direct-current (DC) input lines, and this discharge relay is turned on to cause the electric charge in the smoothing capacitor to be consumed in the discharge resistance.

CITATION LIST

Patent Literature

PTL 1: Japanese Patent Laying-Open No. 10-164709
PTL 2: Japanese Patent Laying-Open No. 2009-106054
PTL 3: Japanese Patent Laying-Open No. 2006-224772

SUMMARY OF INVENTION

Technical Problem

In recent years, the so-called plug-in vehicle that charges a battery inside the vehicle with electric power from an external power supply is being developed. The plug-in vehicle is provided with a charging device converting the alternating-current (AC) power of the external power supply into DC power that can be supplied to the battery. This charging device is generally provided on its output side with a capacitor. When the battery is charged from the external power supply, electric charge is accumulated in the capacitor of the charging device. This results in the state where electric charge remains in the capacitor of the charging device at the end of charging. When a discharge relay and a discharge resistance are additionally provided for the purpose of discharging the electric charge remaining in the capacitor of this charging device, the cost increases.

The present invention has been made to solve the above-described problems. An object of the present invention is to provide a vehicle capable of charging a power storage device therewithin by an external power supply, and configured to allow discharging of electric charge in a capacitor of a charging device without having to provide an additional component.

Solution to Problem

A vehicle according to the present invention is capable of being connected to an external power supply. The vehicle includes a load consuming electric power; a first relay; a second relay; a first power storage device connected to the load through the first relay and configured such that a plurality of battery modules separately disposed are connected in series through the second relay; a charging device including a capacitor connected to the first power storage device in parallel with the load and connected to the load through the first relay, and converting electric power supplied from the external power supply into electric power that can be supplied to the first power storage device; and a control device controlling at least the first relay and the second relay. When charging from the external power supply to the first power storage device is completed, the control device interrupts a first charge path from the charging device to the first power storage device by turning off the second relay, and ensures a discharge path from the charging device to the load by turning on the first relay, thereby causing electric charge remaining in the capacitor to be discharged through the load.

Preferably, when charging is performed, the control device interrupts the discharge path by turning off the first relay and ensures the first charge path by turning on the second relay.

Preferably, the vehicle further includes a third relay. The capacitor is connected to the first power storage device through the third relay and connected to the load through the first relay and the third relay. When charging is performed, the control device interrupts the discharge path by turning off the first relay and ensures the first charge path by turning on the second relay and the third relay. When charging is completed, the control device interrupts the first charge path by turning off the second relay and ensures the discharge path by turning on the first relay and the third relay.

Preferably, the vehicle further includes a fourth relay; a fifth relay; and a second power storage device connected to the load through the fourth relay in parallel with the first power storage device, connected to the capacitor through the first relay, the third relay and the fourth relay, and connected to the capacitor through the fifth relay. When charging is performed, the control device interrupts the discharge path by turning off the first relay and the fourth relay, and ensures the first charge path and a second charge path from the charging device to the second power storage device by turning on the second relay, the third relay and the fifth relay. When charging is completed, the control device interrupts the first charge path and the second charge path by turning off the second relay, the fourth relay and the fifth relay, and ensures the discharge path by turning on the first relay and the third relay.

Preferably, the load is a power control device for converting the electric power of the first power storage device into electric power for driving an electric motor generating driving force for the vehicle.

Advantageous Effects of Invention

According to the present invention, in the vehicle capable of charging a power storage device provided therewithin by an external power supply, electric charge in the capacitor of the charging device can be discharged without having to provide an additional component.

DESCRIPTION OF EMBODIMENTS

Figure 1:
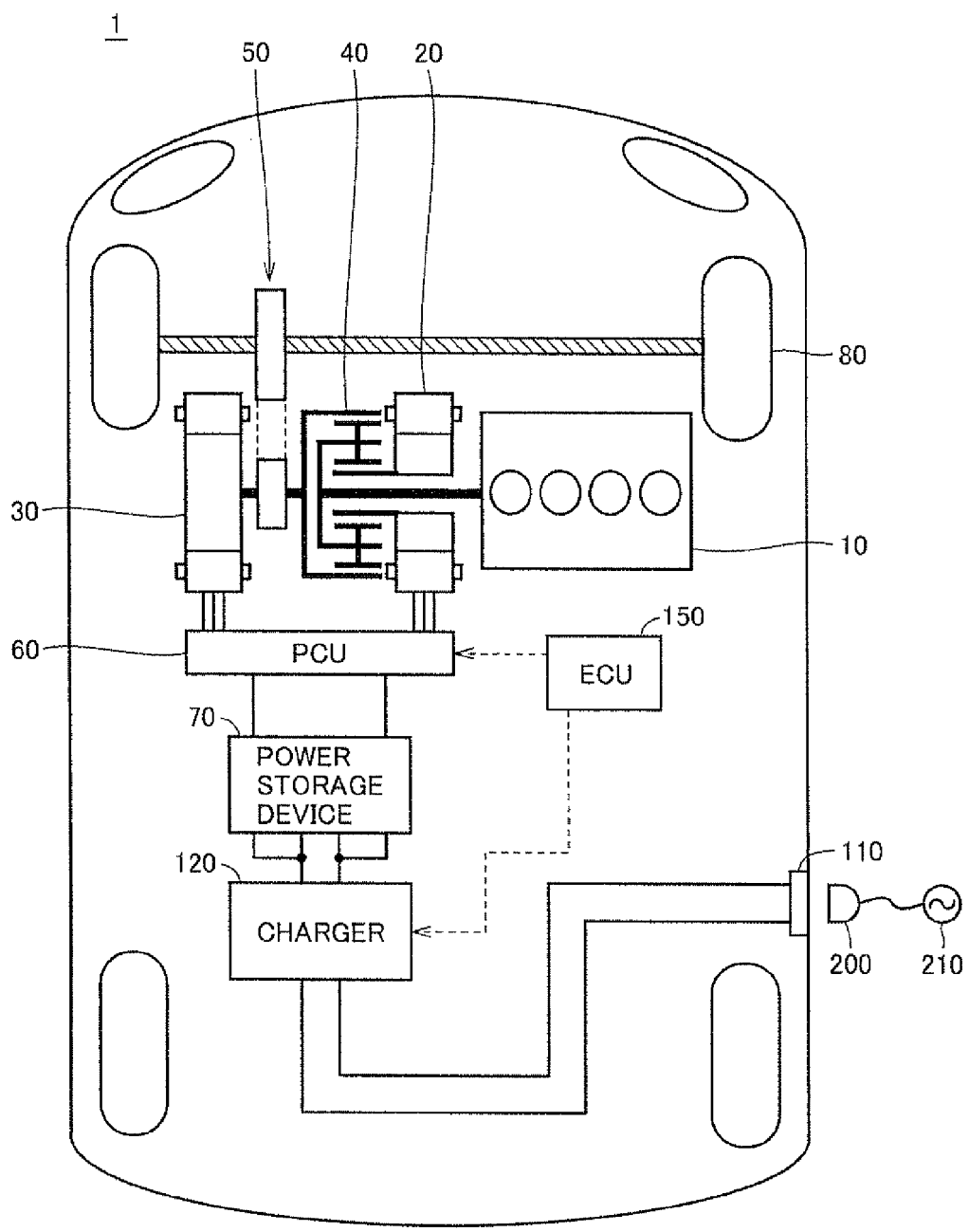
FIG. 1 is an entire block diagram of a vehicle according to the embodiment of the present invention.

The embodiments of the present invention will be hereinafter described in detail with reference to the accompanying drawings, in which the same or corresponding components are designated by the same reference characters, and description thereof will not be repeated.

FIG. 1 is an entire block diagram of a vehicle 1 according to an embodiment of the present invention. Referring to FIG. 1, this vehicle 1 includes an engine 10, a first MG (Motor Generator) 20, a second MG 30, a power split device 40, a reduction gear 50, a PCU (Power Control Unit) 60, a power storage device 70, and a driving wheel 80. Vehicle 1 further includes a charging port 110, a charger 120, and an ECU (Electronic Control Unit) 150.

Engine 10, first MG 20 and second MG 30 are coupled to power split device 40. Vehicle 1 is driven by the driving force output from at least one of engine 10 and second MG 30. The power generated by engine 10 is divided by power split device 40 into two separate paths. In other words, one of the paths leads through reduction gear 50 to driving wheel 80 while the other of the paths leads to first MG 20.

First MG 20 and second MG 30 each serve as an AC electric motor which is, for example, a three-phase AC synchronous electric motor. First MG 20 and second MG 30 are driven by PCU 60. First MG 20 generates electric power using the motive power of engine 10 split by power split device 40. The electric power generated by first MG 20 is converted from the alternating current into a direct current by PCU 60 and stored in power storage device 70.

Second MG 30 generates driving force using at least one of the electric power stored in power storage device 70 and the electric power generated by first MG 20. The driving force of second MG 30 is then transmitted to driving wheel 80 via reduction gear 50. Although driving wheel 80 is shown as a front wheel in FIG. 1, a rear wheel may be driven by second MG 30 in place of the front wheel or together with the front wheel.

In addition, during braking and the like of the vehicle, second MG 30 is driven by driving wheel 80 via reduction gear 50, to cause second MG 30 to operate as a power generator. Thus, second MG 30 also functions as a regenerative brake which converts the kinetic energy of the vehicle into electric power. The electric power generated by second MG 30 is stored in power storage device 70.

Power split device 40 is formed of a planetary gear including a sun gear, a pinion gear, a carrier, and a ring gear. The pinion gear engages with the sun gear and the ring gear. The carrier supports the pinion gear in a rotatable manner and is coupled to the crankshaft of engine 10. The sun gear is coupled to the rotation shaft of first MG 20. The ring gear is coupled to the rotation shaft of second MG 30 and reduction gear 50.

PCU 60 converts the DC power stored in power storage device 70 into an AC power for driving first MG 20 and second MG 30. PCU 60 includes a converter and an inverter which are controlled based on the control signal from ECU 150. The converter boosts the voltage of the DC power received from power storage device 70 and outputs the power to the inverter. The inverter converts the DC power output from the converter into AC power and outputs the power to first MG 20 and/or second MG 30. Consequently, first MG 20 and/or second MG 30 are driven by the electric power stored in power storage device 70. Furthermore, the inverter converts the AC power generated by first MG 20 and/or second MG 30 into DC power, and then, outputs the power to the converter. The converter lowers the voltage of the DC power output from the inverter, and outputs the power to power storage device 70. Consequently, power storage device 70 is charged with the electric power generated by first MG 20 and/or second MG 30.

In addition, PCU 60 also functions as a discharge circuit of capacitor 122 in charger 120, which will be described later in detail.

Power storage device 70 is a rechargeable DC power supply, which is, for example, formed of a secondary battery such as a nickel-metal hydride or lithium-ion secondary battery. The voltage of power storage device 70 is, for example, approximately 200V. Power storage device 70 is charged with the electric power generated by first MG 20 and/or second MG 30 as descried above and also charged with the electric power supplied from an external power supply 210 as described below, It is to be noted that a large capacity capacitor can also be employed as power storage device 70.

Charging port 110 serves as a power interface for receiving electric power from external power supply 210. When power storage device 70 is charged from external power supply 210, a connector 200 of the charging cable for supplying electric power from external power supply 210 to the vehicle is connected to charging port 110.

Charger 120 is electrically connected to charging port 110 and power storage device 70. Then, in the charging mode in which power storage device 70 is charged from external power supply 210, charger 120 performs voltage conversion of the electric power supplied from external power supply 210 to a voltage level of power storage device 70 based on a control signal from ECU 150, to charge power storage device 70.

ECU 150 generates a control signal for driving PCU 60 and charger 120, and outputs the generated control signal to PCU 60 and charger 120.

Figure 2:
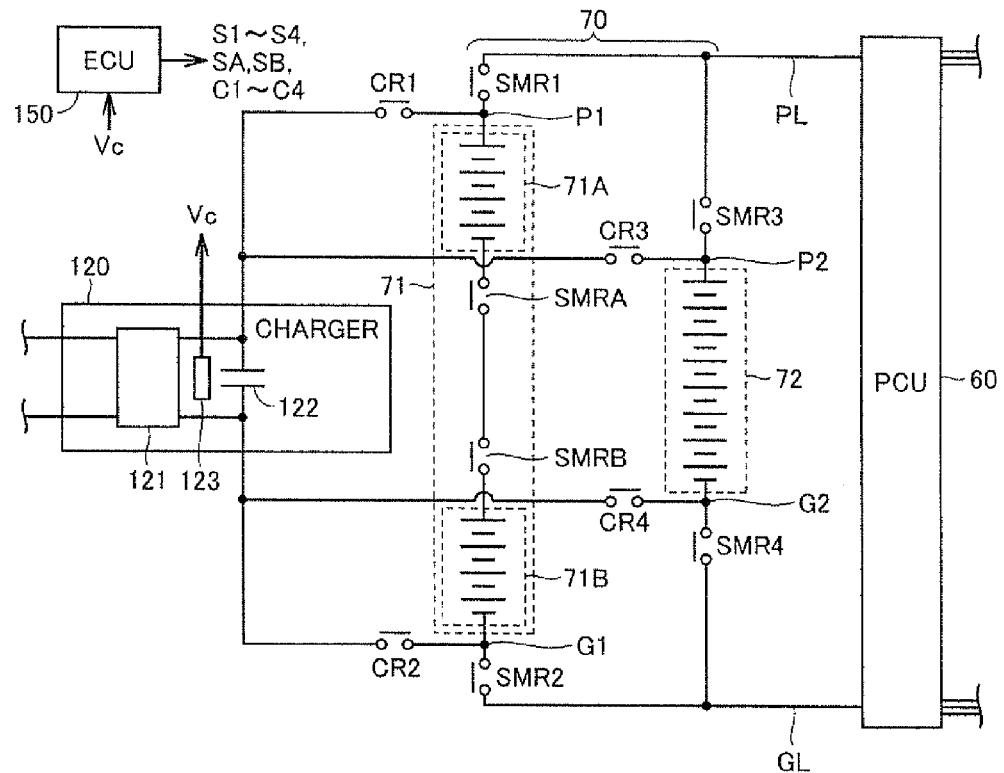
FIG. 2 is a detailed configuration diagram of a power storage device and a charger.

FIG. 2 is a detailed configuration diagram of power storage device 70 and charger 120 showing in FIG. 1.

In the present embodiment, power storage device. 70 includes a first power storage device 71 and a second power storage device 72. First power storage device 71 and second power storage device 72 are connected to PCU 60 in parallel with each other. First power storage device 71 and second power storage device 72 each are a battery set formed by a plurality of battery cells connected in series.

First power storage device 71 is configured in such a manner that it is divided into a first module 71A and a second module 71B. First module 71A and second module 71B are connected in series through system main relays SMRA and SMRB. More specifically, the negative electrode of first module 71A and the positive electrode of second module 71B are connected through system main relays SMRA and SMRB.

First power storage device 71 is connected to PCU 60 through system main relays SMR1 and SMR2. More specifically, the positive electrode of first power storage device 71 (the positive electrode of first module 71A) is connected to a power line PL extending from PCU 60 through system main relay SMR1. The negative electrode of first power storage device 71 (the negative electrode of second module 71B) is connected to a ground line GL extending from PCU 60 through system main relay SMR2.

Second power storage device 72 is connected to PCU 60 through system main relays SMR3 and SMR4 in parallel with first power storage device 71. More specifically, the positive electrode of second power storage device 72 is connected to power line PL through system main relay SMR3. The negative electrode of second power storage device 72 is connected to ground line GL through system main relay SMR4.

Charger 120 includes a power conversion unit 121, a capacitor 122 and a voltage sensor 123.

Based on the control signal from ECU 150, power conversion unit 121 converts the AC power input from external power supply 210 via charging port 110 into DC power that can be supplied to power storage device 70. Power conversion unit 121 then outputs this DC power to power storage device 70.

Capacitor 122 is provided on the output side of charger 120. More specifically, the positive electrode of capacitor 122 is connected to the power line connecting power conversion unit 121 and power storage device 70. The negative electrode of capacitor 122 is connected to the ground line connecting power conversion unit 121 and power storage device 70. When capacitor 122 stores or discharges the electric charge, the electric power output from power conversion unit 121 to power storage device 70 is smoothed. Voltage sensor 123 detects a voltage Vc across the terminals of capacitor 122, and outputs the detection result to ECU 150.

Capacitor 122 of charger 120 is connected to first power storage device 71 through charging relays CR1 and CR2, and also connected to second power storage device 72 through charging relays CR3 and CR4. More specifically, the positive electrode of capacitor 122 is connected through charging relay CR1 to a point P1 between the positive electrode of first power storage device 71 (the positive electrode of first module 71A) and system main relay SMR1. The negative electrode of capacitor 122 is connected through charging relay CR2 to a point G1 between the negative electrode of first power storage device 71 (the negative electrode of second module 71B) and system main relay SMR2. Furthermore, the positive electrode of capacitor 122 is connected through charging relay CR3 to a point P2 between the positive electrode of second power storage device 72 and system main relay SMR3. The negative electrode of capacitor 122 is connected through charging relay CR4 to a point G2 between the negative electrode of second power storage device 72 and system main relay SMR4. Consequently, capacitor 122 is connected to PCU 60 through charging relays CR1, CR2, system main relays SMR1, and SMR2, and also connected to PCU 60 through charging relays CR3, CR4, system main relays SMR3, and SMR4.

Turning on/off of each of system main relays SMR1 to SMR4, SMRA, SMRB, and charging relays CR1 to CR4 is controlled by control signals S1 to S4, SA, SB, and C1 to C4, respectively, from ECU 150.

Figure 3:
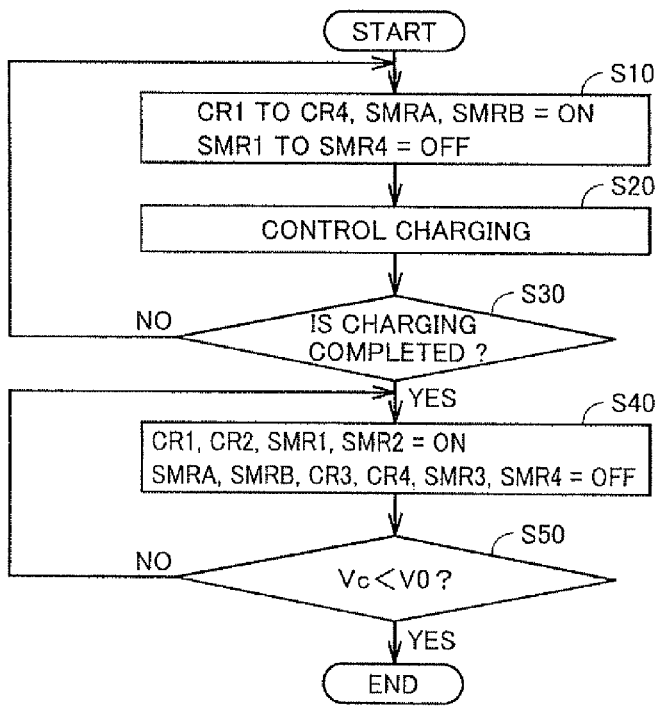
FIG. 3 is a flowchart showing the control processing procedure performed by the ECU in the charging mode.

FIG. 3 is a flowchart showing the control processing procedure performed by ECU 150 in the charging mode as described above. This flowchart is started, for example, when a user connects connector 200 to charging port 110. Each step (which will be hereinafter abbreviated as "S") in this flowchart is basically implemented by software processing by ECU 150, but may be implemented by hardware processing by an electronic circuit and the like provided in ECU 150.

In S10, ECU 150 turns on charging relays CR1 to CR4, system main relays SMRA and SMRB, and turns off system main relays SMR1 to SMR4.

In S20, ECU 150 charges power storage device 70 using the electric power of external power supply 210. In other words, ECU 150 controls charger 120 to convert the AC power input from external power supply 210 via charging port 110 into DC power that can be supplied to power storage device 70, and then output this DC power to power storage device 70.

In S30, ECU 150 determines whether charging from external power supply 210 to power storage device 70 is completed or not. This determination is made, for example, based on whether or not the amount of electric power stored in each of first power storage device 71 and second power storage device 72 reached a target value.

When charging is not completed (NO in S30), the process is returned to S10, and then, the processes of S10 and S20 are repeatedly performed.

On the other hand, when charging is completed (YES in S30), in S40, ECU 150 turns on charging relays CR1, CR2, system main relays SMR1, and SMR2, and turns off system main relays SMRA, SMRB, charging relays CR3, CR4, system main relays SMR3, and SMR4.

In S50, ECU 150 determines whether voltage Vc across the terminals of capacitor 122 is smaller than a prescribed value V0. When voltage Vc across the terminals of capacitor 122 is greater than prescribed value V0 (NO in S50), the process is returned to S40. When voltage Vc across the terminals of capacitor 122 is smaller than prescribed value V0 (YES in S40), ECU 150 ends the charging mode. In addition, each relay is turned off after the end of the charging mode. Then, when the user operates the start switch that is not shown for driving vehicle 1, system main relays SMR1 to SMR4, SMRA, and SMRB are turned on to cause power storage device 70 and PCU 60 to be connected.

The operation of each relay based on the above-described structure and flowchart will then be described. In the charging mode, charging relays CR1 to CR4, system main relays SMRA and SMRB are kept turned on until charging from external power supply 210 to power storage device 70 is completed (S10). Accordingly, power storage device 70 and charger 120 are connected, thereby ensuring the charge path from external power supply 210 to power storage device 70 (the charge path from external power supply 210 to first power storage device 71 and the charge path from external power supply 210 to second power storage device 72). In this case, system main relays SMR1 to SMR4 are turned off to interrupt the connection between power storage device 70 and PCU 60 and the connection between charger 120 and PCU 60. This causes the discharge path to be interrupted from power storage device 70 and charger 120 to PCU 60.

In addition, electric charge is stored also in capacitor 122 provided on the output side of charger 120 during charging. Consequently, if charging relays CR1 to CR4 are turned off immediately when charging is completed, electric charge is to remain in capacitor 122.

Thus, in the present embodiment, when charging is completed, charging relays CR1 to CR4 are not immediately turned off, but charging relays CR1, CR2, system main relays SMR1, and SMR2 are turned on, thereby causing charger 120 and PCU 60 to be connected. Consequently, the discharge path from capacitor 122 of charger 120 to PCU 60 is ensured.

Figure 4:
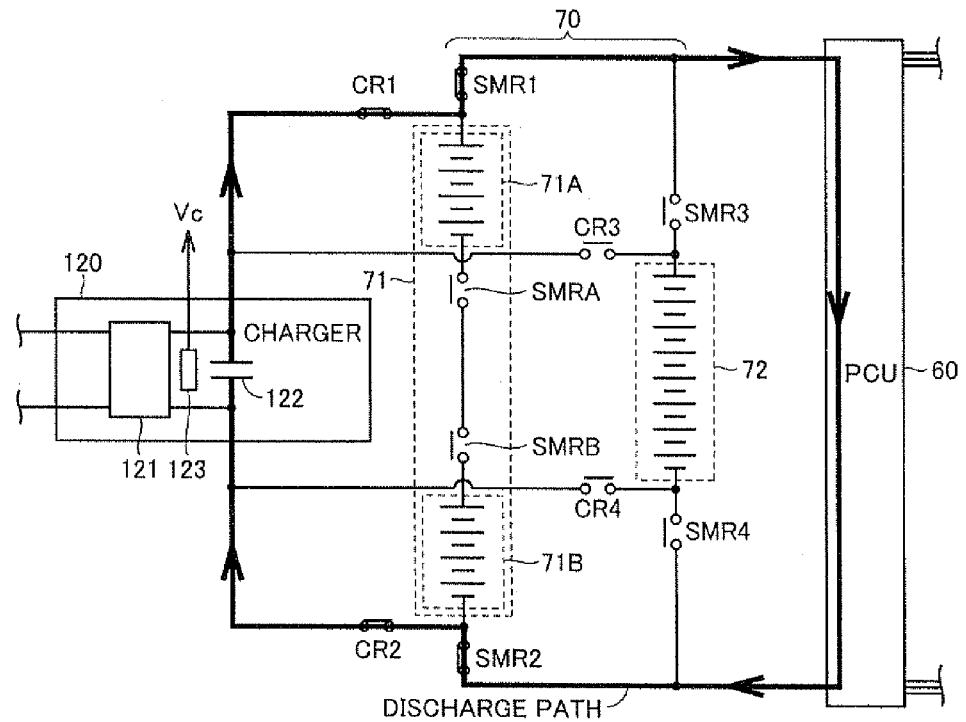
FIG. 4 is a diagram (first) showing a discharge path for electric charge remaining in a capacitor of the charger.

FIG. 4 shows a discharge path from capacitor 122 of charger 120 to PCU 60, As shown in FIG. 4, since capacitor 122 and PCU 60 are connected by turning on charging relays CR1, CR2, system main relays SMR1, and SMR2, the electric charge remaining in capacitor 122 at the time of completion of charging is to be discharged through PCU 60. In this way, since PCU 60 functions as a discharge circuit of capacitor 122, the electric charge remaining in capacitor 122 can be discharged without having to additionally provide a dedicated discharge circuit.

In this case, system main relays SMRA and SMRB are turned off to interrupt the energizing path within first power storage device 71, This causes the charge path from capacitor 122 to first power storage device 71 to be interrupted. Furthermore, charging relays CR3, CR4, system main relays SMR3, and SMR4 are turned off, so that the charge path from capacitor 122 to second power storage device 72 is also interrupted. Accordingly, the electric charge remaining in capacitor 122 after completion of charging can be prevented from being supplied to first power storage device 71 and second power storage device 72 and causing overcharging to occur.

As described above, when charging from external power supply 210 to power storage device 70 is completed, vehicle 1 according to the present embodiment controls each relay to interrupt the charge path from charger 120 to power storage device 70 and to ensure the discharge path from charger 120 to PCU 60. Consequently, the electric charge remaining in capacitor 122 provided on the output side of charger 120 at the completion of charging can be discharged through PCU 60 after the completion of charging without having to supply the electric charge to power storage device 70. Accordingly, without having to additionally provide a dedicated discharge circuit, the electric charge remaining in capacitor 122 can be discharged while preventing power storage device 70 from being overcharged.

It is to be noted that the present embodiment can also be modified, for example, as described below.

Although the present invention is applied to vehicle 1 including first power storage device 71 and second power storage device 72 in the present embodiment, the present invention may also be applied to the vehicle including only first power storage device 71.

Although the electric charge remaining in capacitor 122 is discharged through PCU 60 in the present embodiment, the electric charge may also be discharged through other existing devices.

In the present embodiment, in the process of S40 in FIG. 3, charging relays CR1, CR2, system main relays SMR1, and SMR2 are turned on while system main relays SMRA, SMRB, charging relays CR3, CR4, system main relays SMR3, and SMR4 are turned off. However, the combination of turning on/off of each relay in the process of S40 in FIG. 3 only needs to allow interruption of the charge path from charger 120 to power storage device 70 while ensuring the discharge path from charger 120 to PCU 60. Accordingly, the combination of turning on/if of each relay can be changed, for example, as described below.

Figure 5:
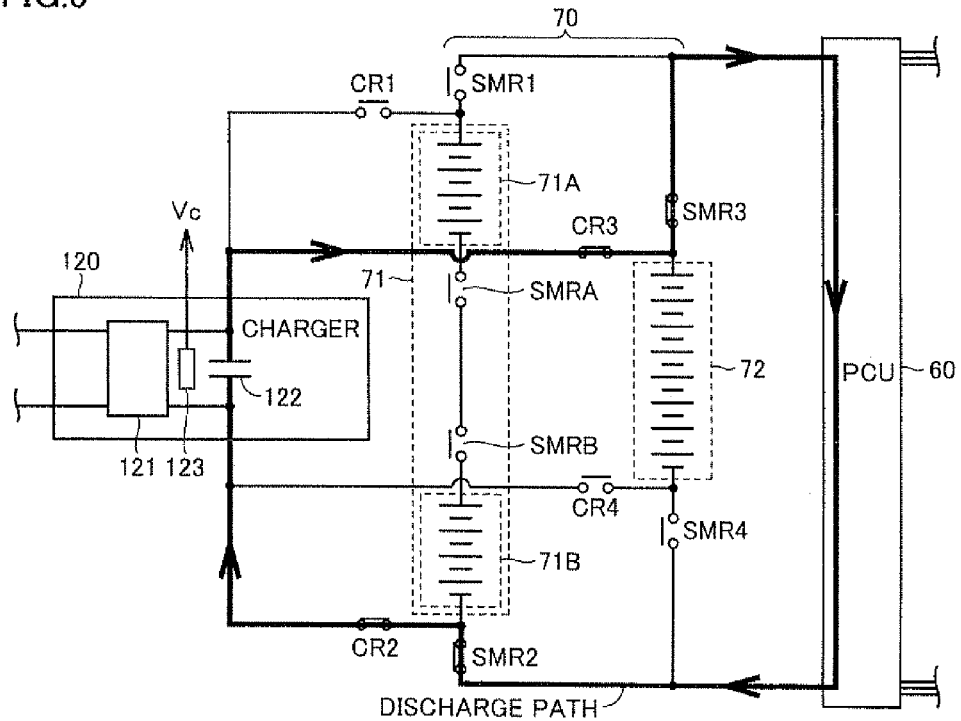
FIG. 5 is a diagram (second) showing the discharge path for electric charge remaining in the capacitor of the charger.

In the process of S40 in FIG. 3, as shown in FIG. 5, charging relays CR2, CR3, system main relays SMR2, and SMR3 are turned on while charging relays CR1, CR4, system main relays SMR1, SMR4, SMRA, and SMRB are turned off. This combination can also prevent overcharging of power storage device 70 while allowing the electric charge remaining in capacitor 122 to be discharged through PCU 60.

Figure 6:
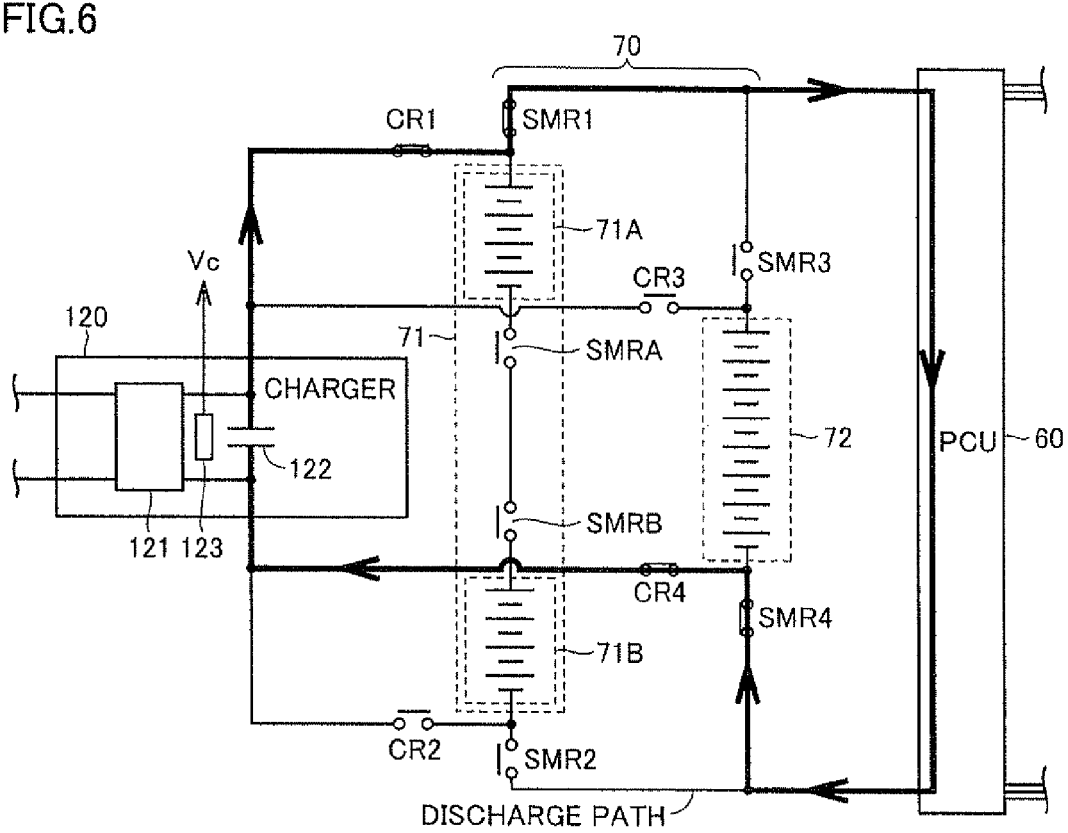
FIG. 6 is a diagram (third) showing the discharge path for electric charge remaining in the capacitor of the charger.

In the process of S40 in FIG. 3, as shown in FIG. 6, charging relays CR1, CR4, system main relays SMR1, and SMR4 are turned on while charging relays CR2, CR3, system main relays SMR2, SMR3, SMRA, and SMRB are turned off. This combination can also prevent overcharging of power storage device 70 while allowing the electric charge remaining in capacitor 122 to be discharged through PCU 60.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 1 vehicle, 10 engine, 40 power split device, 50 reduction gear, 60 PCU, 70 power storage device, 71 first power storage device, 71A first module, 71B second module, 72 second power storage device, 80 driving wheel, 110 charging port, 120 charger, 121 power conversion unit, 122 capacitor, 123 voltage sensor, 150 ECU, 200 connector, 210 external power supply, CR1 to CR4 charging relay, GL ground line, PL power line, SMR1 to SMR4, SMRA, SMRB system main relay.

The invention claimed is:

1. A vehicle capable of being connected to an external power supply, said vehicle comprising:
a load consuming electric power;
a first relay;
a second relay;
a third relay;
a first power storage device connected to said load through said first relay and configured such that a plurality of battery modules separately disposed are connected in series through said second relay;
a charging device including a capacitor connected to said first power storage device in parallel with said load, and converting electric power supplied from said external power supply into electric power that can be supplied to said first power storage device, said capacitor being connected to said first power storage device through said third relay and connected to said load through said first relay and said third relay; and
a control device controlling said first relay, said second relay and said third relay, wherein
when charging from said external power supply to said first power storage device is performed, said control device interrupts a discharge path from said charging device to said load by turning off said first relay, and ensures a first charge path from said charging device to said first power storage device by turning on said second relay and said third relay, and
when said charging is completed, said control device interrupts said first charge path by turning off said second relay, and ensures said discharge path by turning on said first relay and said third relay, thereby causing electric charge remaining in said capacitor to be discharged through said load.

2. The vehicle according to claim 1, further comprising:
a fourth relay;
a fifth relay; and
a second power storage device connected to said load through said fourth relay in parallel with said first power storage device, connected to said capacitor through said first relay, said third relay and said fourth relay, and connected to said capacitor through said fifth relay, wherein
when said charging is performed, said control device interrupts said discharge path by turning off said first relay and said fourth relay, and ensures said first charge path and a second charge path from said charging device to said second power storage device by turning on said second relay, said third relay and said fifth relay, and
when said charging is completed, said control device interrupts said first charge path and said second charge path by turning off said second relay, said fourth relay and said fifth relay, and ensures said discharge path by turning on said first relay and said third relay.

3. The vehicle according to claim 1, wherein said load is a power control device for converting the electric power of said first power storage device into electric power for driving an electric motor generating driving force for said vehicle.

* * * * *